United States Patent
Grace et al.

(10) Patent No.: US 9,555,787 B2
(45) Date of Patent: Jan. 31, 2017

(54) BRAKE BOOSTER WITH TUNABLE RELEASE

(71) Applicant: Robert Bosch GmbH, Stuttgart (DE)

(72) Inventors: William Grace, Granger, IN (US); Mark Lacosse, Granger, IN (US)

(73) Assignee: Robert Bosch GmbH, Stuttgart (DE)

(*) Notice: Subject to any disclaimer, the term of this patent is extended or adjusted under 35 U.S.C. 154(b) by 317 days.

(21) Appl. No.: 14/316,360

(22) Filed: Jun. 26, 2014

(65) Prior Publication Data

US 2015/0283986 A1  Oct. 8, 2015

Related U.S. Application Data

(60) Provisional application No. 61/976,675, filed on Apr. 8, 2014.

(51) Int. Cl.
*B60T 13/57* (2006.01)
*B60T 13/52* (2006.01)
(Continued)

(52) U.S. Cl.
CPC ............... *B60T 13/57* (2013.01); *B60T 8/448* (2013.01); *B60T 8/449* (2013.01); *B60T 8/5087* (2013.01);
(Continued)

(58) Field of Classification Search
CPC ........ B60T 8/448; B60T 8/449; B60T 8/5087; B60T 13/52; B60T 13/56; B60T 13/569; B60T 13/57; Y10T 29/49236
(Continued)

(56) References Cited

U.S. PATENT DOCUMENTS 3,165,031 A  1/1965 Rockwell
3,799,303 A  3/1974 Stoltman
(Continued)

FOREIGN PATENT DOCUMENTS

DE  3413739  10/1985
EP  1243493  9/2002
(Continued)

OTHER PUBLICATIONS

PCT International Search Report for International Appl. No. PCT/US2015/016368 dated May 11, 2015, 6 pages.
(Continued)

*Primary Examiner* — Logan Kraft
(74) *Attorney, Agent, or Firm* — Michael Best & Friedrich LLP

(57) ABSTRACT

A vehicle brake booster includes a brake input member configured to receive a braking input force and a booster housing divided into a first chamber adjacent the brake input member and a second chamber remote from the brake input member. A poppet valve includes a poppet valve body and a poppet seal, the poppet valve operable to maintain separation between pressure and vacuum during assisted braking and further being operable to enable evacuation of the air from the first chamber through one or more side ports of the poppet valve body upon release of the braking input force and completion of the assisted braking A restrictor element provides a predetermined release speed for the booster. The one or more side ports define a total flow resistance of the poppet valve body which is less than an effective total flow resistance of the poppet valve body set by the restrictor element.

13 Claims, 12 Drawing Sheets

(51) Int. Cl.
*B60T 13/56* (2006.01)
*B60T 8/44* (2006.01)
*B60T 8/50* (2006.01)
*B60T 13/569* (2006.01)

(52) U.S. Cl.
CPC .............. *B60T 13/52* (2013.01); *B60T 13/56* (2013.01); *B60T 13/569* (2013.01); *Y10T 29/49236* (2015.01)

(58) Field of Classification Search
USPC .......................................................... 60/591
See application file for complete search history.

(56) References Cited

U.S. PATENT DOCUMENTS

| | | | |
|---|---|---|---|
| 4,332,302 A | 6/1982 | Kosmanski | |
| 4,485,904 A | 12/1984 | Udono et al. | |
| 4,628,959 A | 12/1986 | Parker et al. | |
| 4,787,292 A * | 11/1988 | Tsuyuki | B60T 13/57 91/369.3 |
| 4,884,491 A | 12/1989 | Endo | |
| 4,886,085 A | 12/1989 | Miller | |
| 4,953,447 A | 9/1990 | Bender | |
| 5,056,413 A | 10/1991 | Kaub | |
| 5,180,104 A * | 1/1993 | Mellette | B05B 7/0081 239/11 |
| 5,249,505 A | 10/1993 | Hewitt | |
| 5,546,846 A | 8/1996 | Bauer | |
| 5,826,484 A | 10/1998 | Gautier et al. | |
| 6,035,881 A | 3/2000 | Emmerich et al. | |
| 6,212,993 B1 | 4/2001 | Larumbe | |
| 6,398,316 B1 | 6/2002 | Mizutani et al. | |
| 6,912,946 B2 | 7/2005 | Haerr et al. | |
| 7,954,909 B2 | 6/2011 | Yamashita | |
| 8,343,011 B2 | 1/2013 | Cunningham et al. | |
| 8,397,507 B2 | 3/2013 | Scheibel | |
| 2004/0016340 A1 | 1/2004 | Heo | |
| 2004/0255771 A1 | 12/2004 | Tsubouchi et al. | |
| 2006/0016477 A1 | 1/2006 | Zaparackas | |
| 2010/0288119 A1 | 11/2010 | Ickler et al. | |
| 2011/0303083 A1 | 12/2011 | Price | |
| 2012/0080096 A1 | 4/2012 | Manos | |

FOREIGN PATENT DOCUMENTS

| | | |
|---|---|---|
| FR | 2967386 | 5/2012 |
| GB | 596031 | 7/1945 |
| WO | 92/20556 | 11/1992 |
| WO | 02087944 | 11/2002 |

OTHER PUBLICATIONS

PCT Written Opinion for International Appl. No. PCT/US2015/016368 dated May 11, 2015, 5 pages.
M-D Pneumatics, "Mechanical Vacuum Boosters" Installation Operation Maintenance Repair Manual, Jul. 2005 (40 pages).

* cited by examiner

BRAKE BOOSTER WITH TUNABLE RELEASE

CROSS-REFERENCE TO RELATED APPLICATIONS

This application is a non-provisional of U.S Provisional Patent Application No. 61/976,675, filed Apr. 8, 2014, the entire contents of which are incorporated by reference herein.

BACKGROUND

The present invention relates to vehicles and vehicle braking systems. More particularly, the invention relates to the structures within a brake booster that control the release speed of the booster after an assisted brake application.

SUMMARY

In one aspect, the invention provides a vehicle brake booster including a brake input member configured to receive a braking input force and a booster housing divided into a first chamber adjacent the brake input member and a second chamber remote from the brake input member. A poppet valve includes a poppet valve body and a poppet seal, the poppet valve being operable to maintain separation between air having a pressure in the first chamber and a vacuum in the second chamber during assisted braking and further being operable to enable evacuation of the air from the first chamber through one or more side ports of the poppet valve body upon release of the braking input force and completion of the assisted braking A restrictor element is separate from the poppet valve body and configured to provide a predetermined release speed for the booster. The one or more side ports define a total flow resistance of the poppet valve body which is less than an effective total flow resistance of the poppet valve body set by the restrictor element.

In another aspect, the invention provides a method for adapting a vehicle brake booster for a desired release speed. A brake booster is provided including a poppet valve having a poppet valve body including a plurality of side ports through which air flows to escape a pressure side of the brake booster after completion of a brake actuation. The plurality of side ports define a total flow resistance of the poppet valve body. A restrictor element having at least one restriction portion at least partially obstructing a corresponding at least one of the plurality of side ports is inserted to set an effective total flow resistance of the poppet valve body to a predetermined amount that is higher than the total flow resistance of the poppet valve body.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
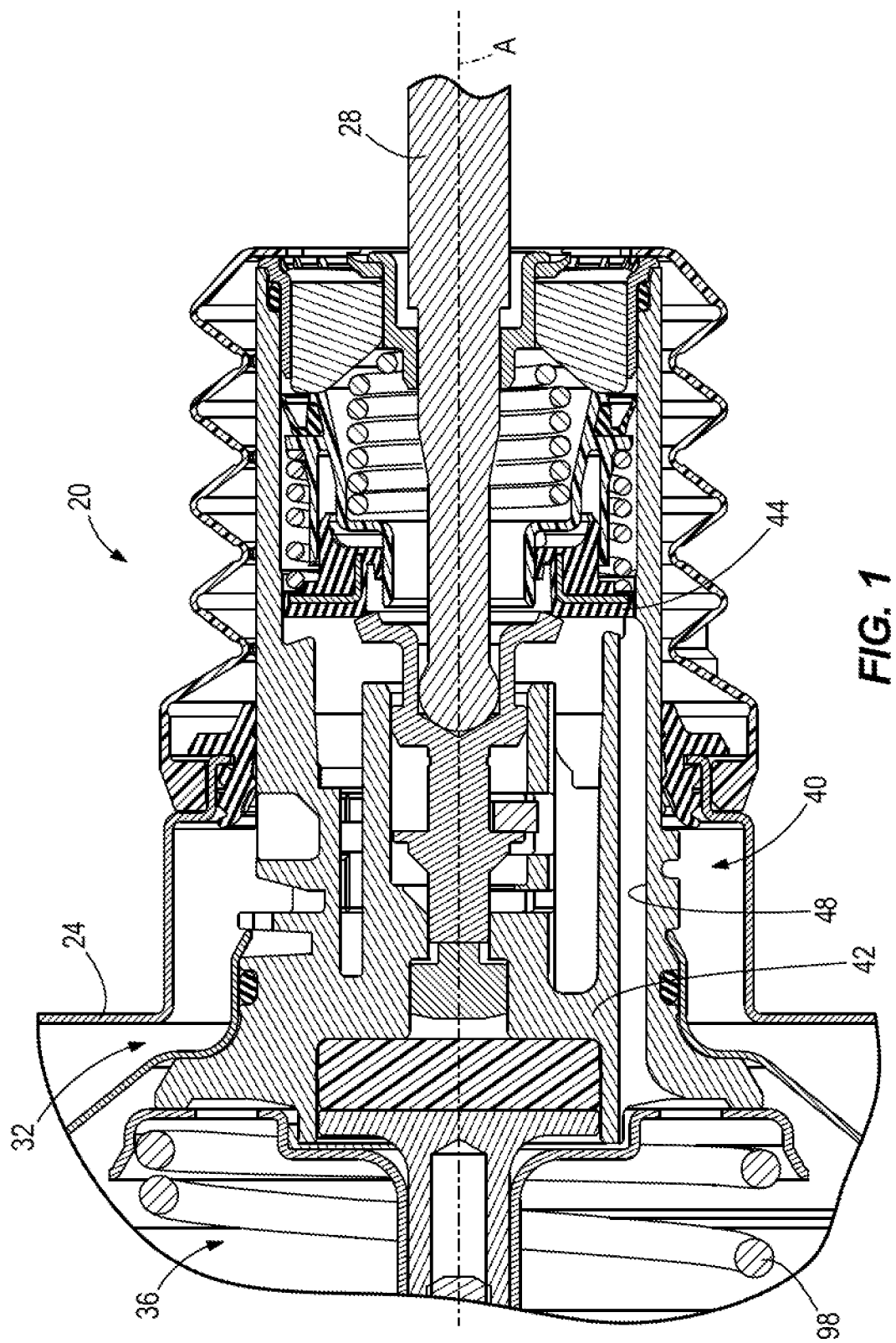
FIG. 1 is a cross-sectional view of a portion of a vehicle brake booster.
Figure 8:
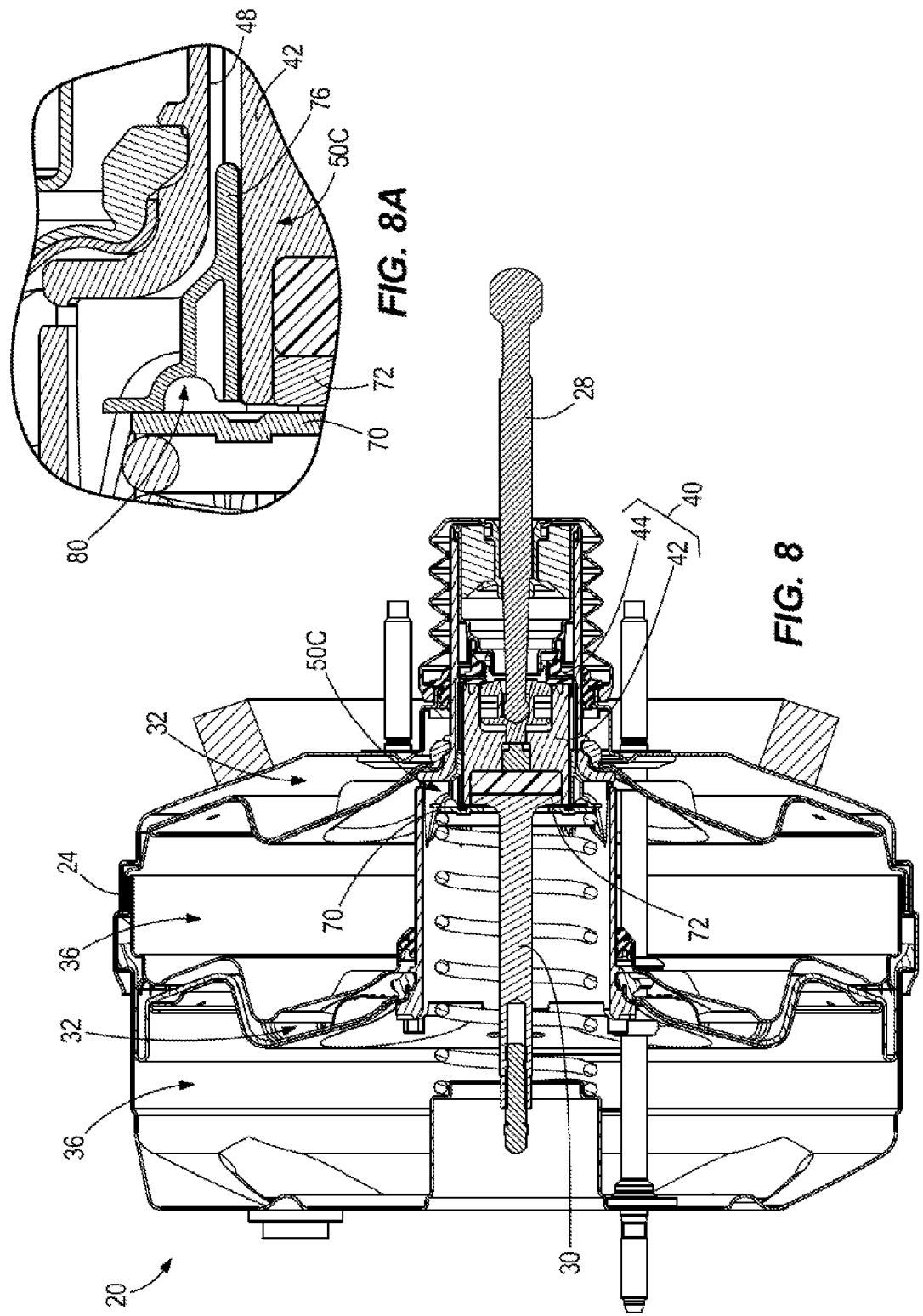
FIG. 8 is a cross-sectional view of a vehicle brake booster, including another restrictor element, made to fit between the poppet valve body and a pushrod retainer of the booster.

FIG. 1 illustrates a portion of a vehicle brake booster 20, which is shown more completely in FIG. 8. The booster 20 includes a booster housing 24 and an input member 28 configured to receive a braking input force for boosting by the booster 20. The input force and the additional boost force are conveyed to an output pushrod 30 which may be coupled to a master cylinder input for actuating one or more hydraulic brake devices. The booster housing 24 is divided into a first chamber 32 adjacent the input member 28 and a second chamber 36 remote from the input member 28. Both chambers 32, 36 can be substantially evacuated of air such that a vacuum condition exists during normal running operation when a brake input is not received by the input member 28. When the input member 28 is actuated, air at atmospheric pressure is allowed to enter the first chamber 32 such that the first chamber 32 becomes pressurized, compared to the vacuum maintained in the second chamber 36, to provide boosting of the input force to a higher force at the output pushrod 30. As shown in FIG. 8, the booster 20 can be a tandem booster, in which two first chambers 32 are provided as well as two second chambers 36.

Figure 2:
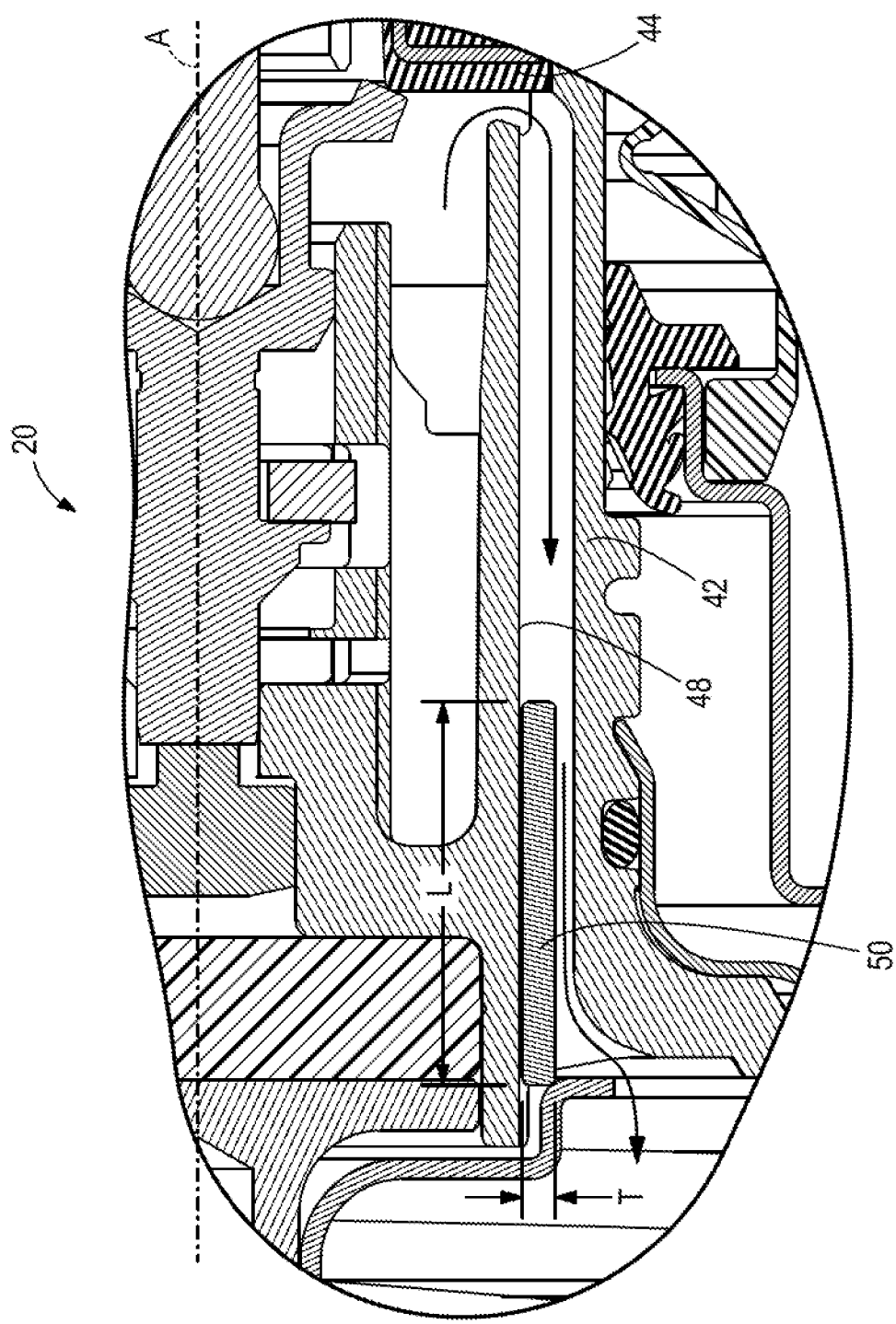
FIG. 2 is a detail view of a side port of a poppet valve body of the vehicle brake booster of FIG. 1, illustrating a restrictor element.
Figure 3:
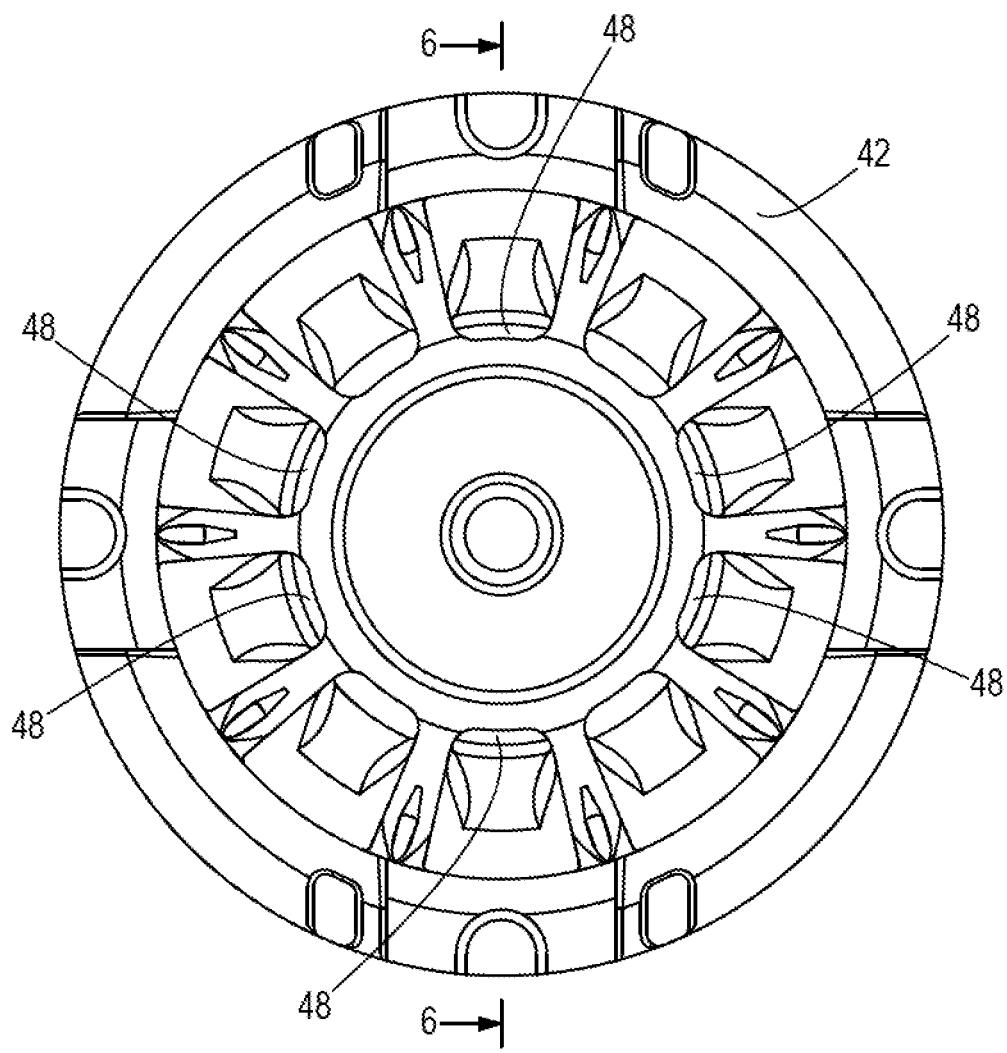
FIG. 3 is an end view of the poppet valve body, illustrating a side port arrangement.

A poppet valve 40 is provided in the booster 20 and is operable to selectively allow the air out of the first chamber 32 after completion of an actuation. The poppet valve 40 includes a poppet valve body 42 and a poppet seal 44. The poppet valve 40 is shown open in the release state in FIGS. 1 and 2. When the input member 28 is actuated, the poppet valve 40 has a separate opening enabling entry of air, but is closed or sealed against the seal 44 to maintain separation between air (e.g., at atmospheric pressure) in the first chamber 32 and a vacuum in the second chamber 36. Upon release of the input member 28, one or more side ports 48 in the poppet valve body 42 enable evacuation of the air from the first chamber 32. One exemplary arrangement of a plurality of side ports 48 is shown in FIG. 3. The side ports 48 can be arranged at ten equally-spaced circumferential locations, although the illustrated valve body 42 is manufactured such that only six of the ten locations are open to form side ports 48 capable of admitting flow. Other designs and arrangements are optional. The number of side ports 48 and their flow resistance to air escaping the first booster chamber 32 determines the release speed of the booster 20. Although release speed should generally be fast enough to avoid undue delay before resetting to a "ready" state, undesirable noise can result from a release speed that is too fast and does not adequately damp the hydraulic return in the brake system downstream of the booster 20. In general, this results in the separate design and manufacture of different valve bodies for use in different vehicles, caused by the need to have different side port configurations to achieve acceptable booster release speed.

In the illustrated construction, the poppet valve body 42, and thus the booster 20, can be set up or modified to achieve a particular release speed with a restrictor element 50 separate from the poppet valve body 42. The restrictor element 50 is configured to provide a predetermined release speed for the booster 20, which is slower (i.e., more flow resistance) than the side ports 48 of the poppet valve body 42 alone. In other words, the side ports 48 define a total flow resistance of the poppet valve body 42 which is less than an effective total flow resistance of the poppet valve body 42 set by the restrictor element 50. The restrictor element 50 is fixed with respect to the poppet valve body 42, and is not movable or adjustable once assembled. The restrictor element 50 has a length L measured parallel to an axis A of the booster 20, and has a thickness T measured perpendicular to the axis A or in a radial direction. The dimensions of the restrictor element 50 determine the flow resistance imparted to air escaping the first chamber 32, and thus the effect on release speed. Although only one restrictor element 50 is shown in FIG. 2, the poppet valve body 42 can be provided with one or more restrictor elements as mentioned above, up to a number matching the number of side ports 48.

Figure 5:
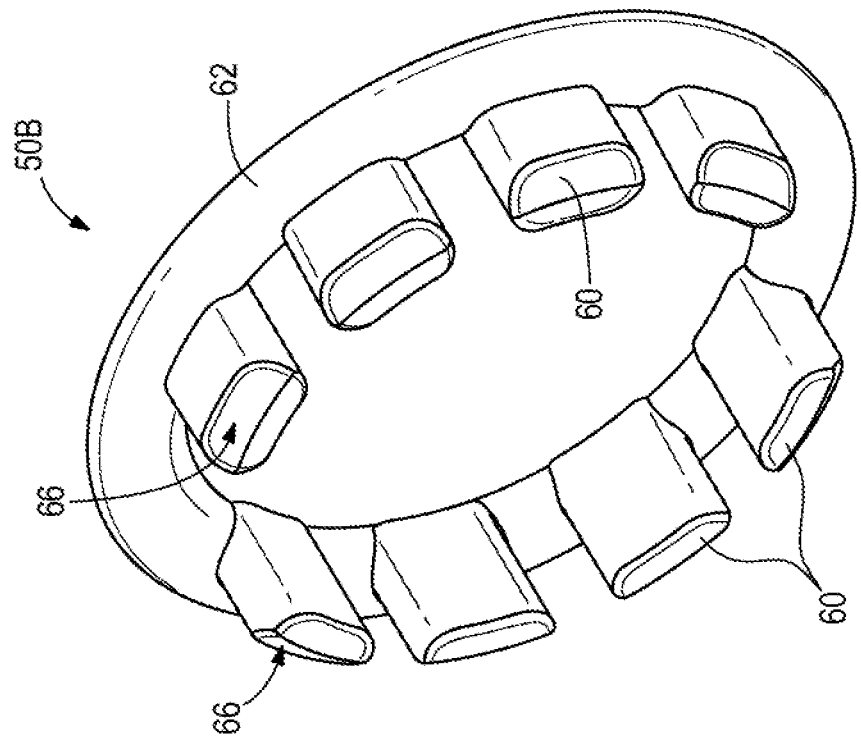
FIG. 5 is a perspective view of another restrictor element having multiple restrictor portions coupled to a connector ring.
Figure 4:
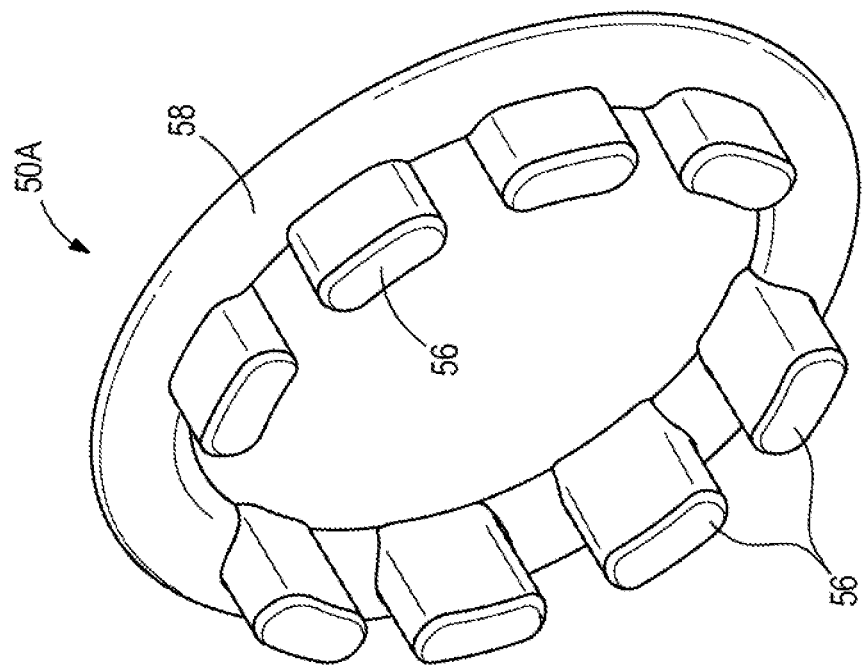
FIG. 4 is a perspective view of a restrictor element having multiple restrictor portions coupled to a connector ring.
Figure 6:
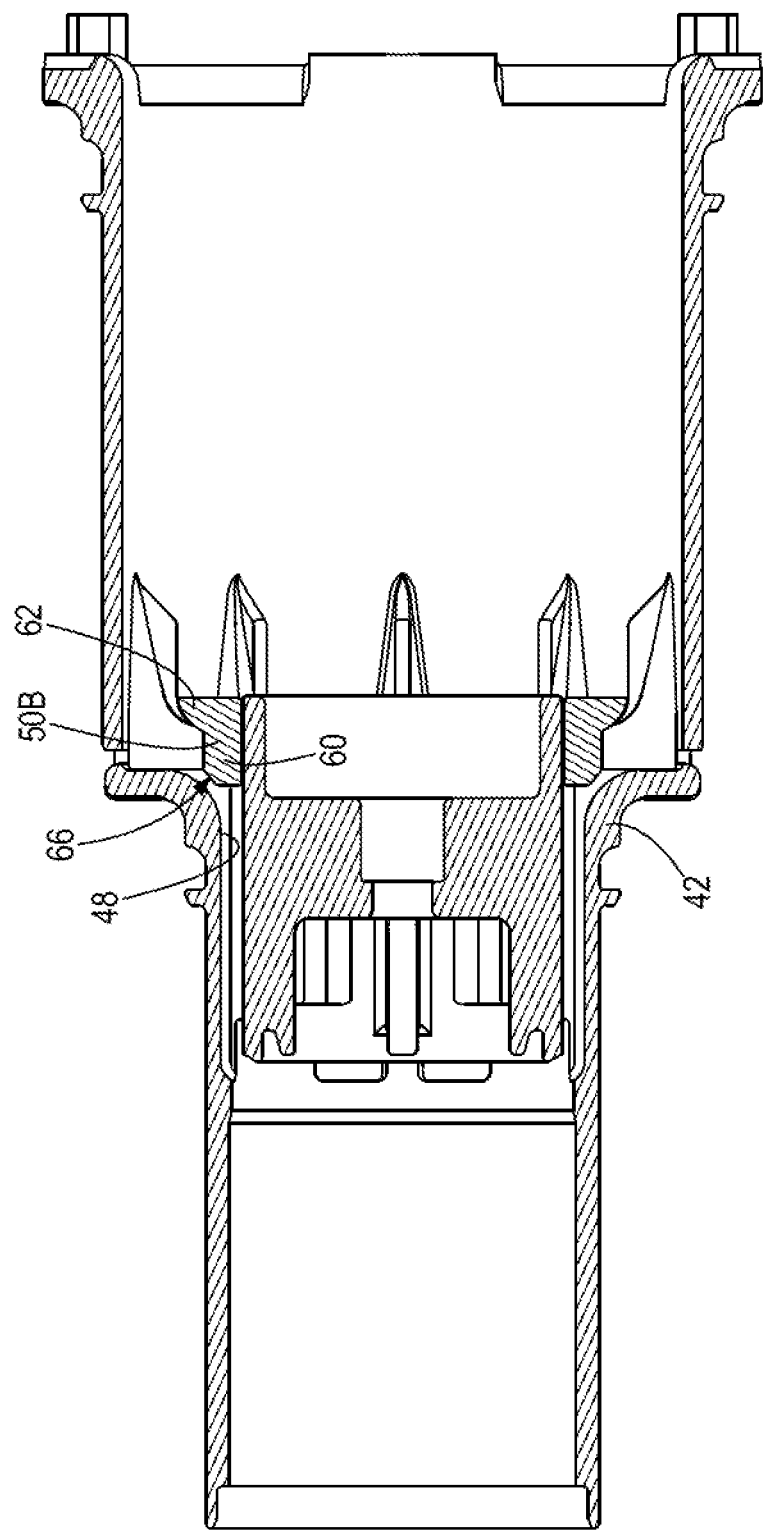
FIG. 6 is a cross-sectional view of the poppet valve body of FIG. 3, having the restrictor element of FIG. 5 placed therein.
Figure 7:
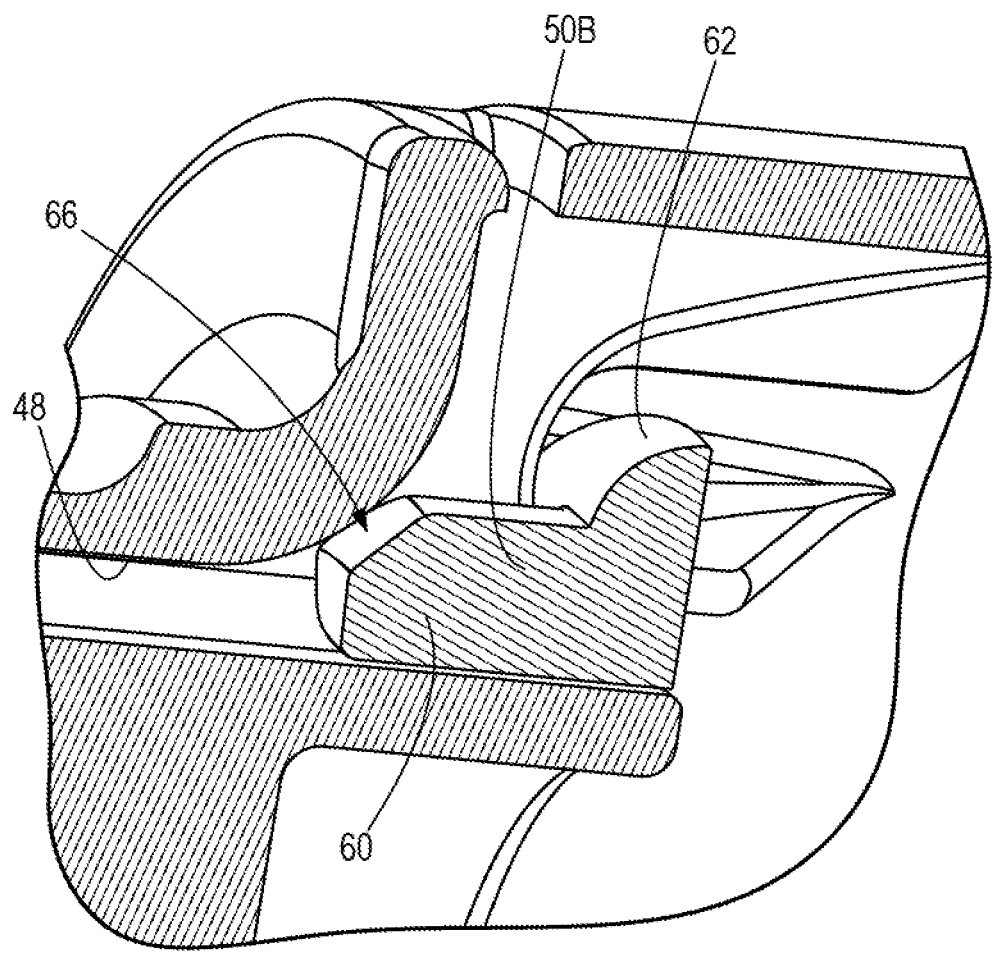
FIG. 7 is a detail view of one of the restrictor elements of FIG. 6.

FIG. 4 illustrates an alternate restrictor element 50A in which a plurality of individual restriction portions 56 are secured to a connector ring 58. In some constructions, the restriction portions 56 and the connector ring 58 are integrally molded as a single piece. FIG. 5 illustrates another restrictor element SOB, which is similar to the restrictor element SOB of FIG. 4, except for having restriction portions 60 of a different shape, particularly at the distal ends away from the connector ring 62. In the restrictor element 50A of FIG. 4, each restriction portion 56 extends from the connector ring 58 with a consistent cross-sectional shape all the way to the respective distal ends. The cross-sectional shape is generally cylindrical, but is elongated in one transverse direction, along a circumferential direction of the connector ring 58, into a flat-sided oval shape. The distal ends are flat. In the restrictor element SOB of FIG. 5, the restriction portions 60 have a shape like the restriction portions 56 of FIG. 4, except that each of the distal ends is truncated on a radially outer side thereof to include an angled surface 66. This results in a cross-sectional area of each restriction portion 60 which decreases toward the distal end. In both FIGS. 4 and 5, the connector rings 58, 62 include a first side facing the restriction portions 56, 60 that is generally rounded and a second opposite side that is generally flat.

FIG. 8 illustrates another alternate restrictor element 50C which fits between the poppet valve body 42 and a pushrod retainer 70 of the booster 20. The pushrod retainer 70 is a plate like structure having a central aperture for pass through of the output pushrod 30. A flanged end 72 of the output pushrod 30 is blocked from separation from the poppet valve body 42 by the pushrod retainer 70. The restrictor element 50C can have one or more restriction portions 76 having a shape as shown or similar to any of the other constructions disclosed herein, and may further have a base portion, which can be a connector ring 80 that couples together multiple restriction portions 76 as described with respect to previous constructions. In the construction of FIG. 8, the connector ring 80 includes a portion (e.g., at a radially outside edge) that is extended or projected to contact the pushrod retainer 70 as shown in FIG. 8. As is optional, the restrictor element 50C is shown with a hollow or semi-hollow construction, which is open to the side of the pushrod retainer 70. From the connector ring 80, the cross-sectional thickness of the restriction portions 76 is constant in the radial direction for a first length, then tapers down to generally mirror the adjacent shape of the side port 48, and then extends a further length with a reduced thickness.

Figure 9:
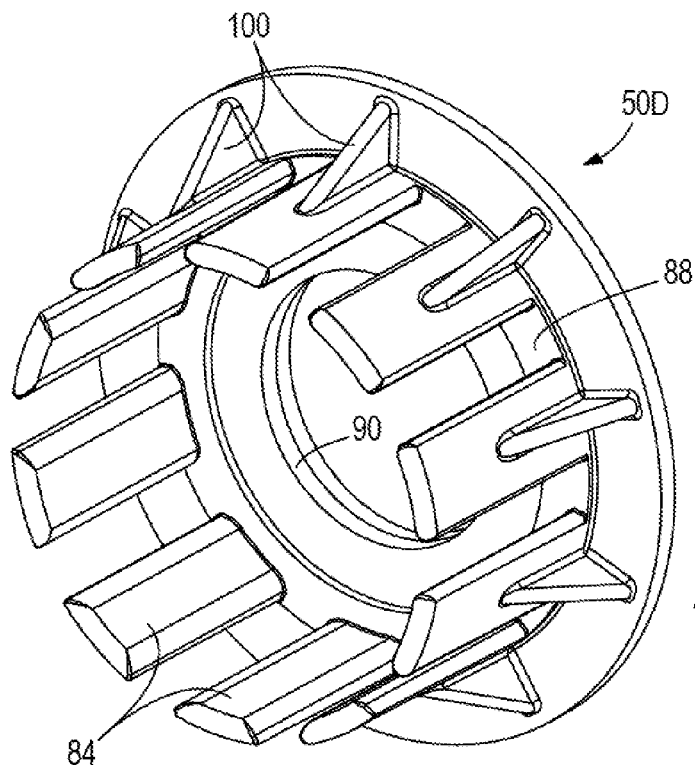
FIG. 9 is a perspective view of a restrictor element in which the restrictor portions are coupled to a connector ring which is a pushrod retainer for the booster.
Figure 10:
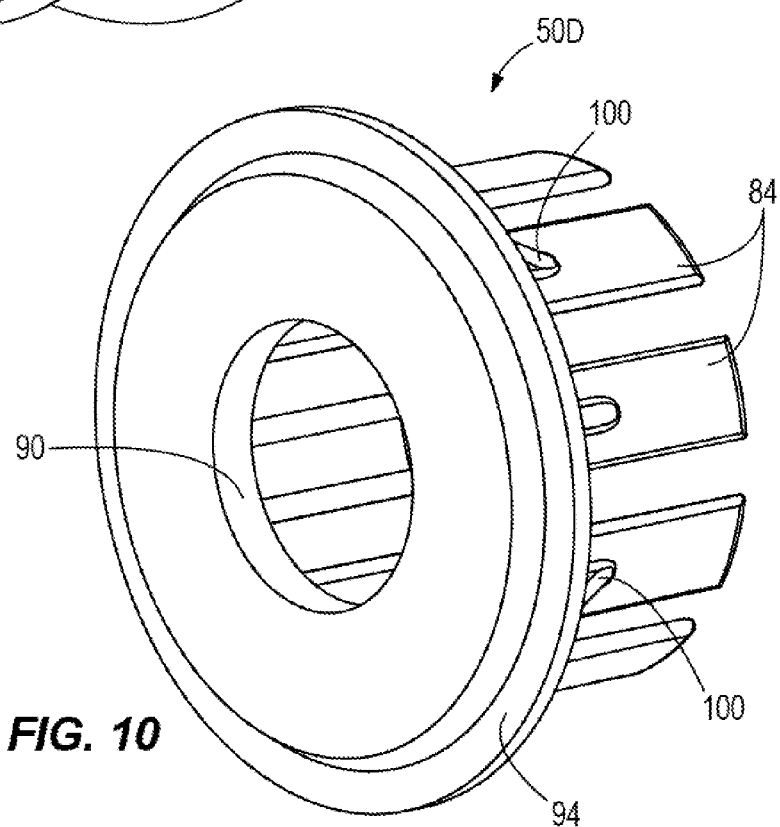
FIG. 10 is an alternate perspective view of the restrictor element of FIG. 9.
Figure 11:
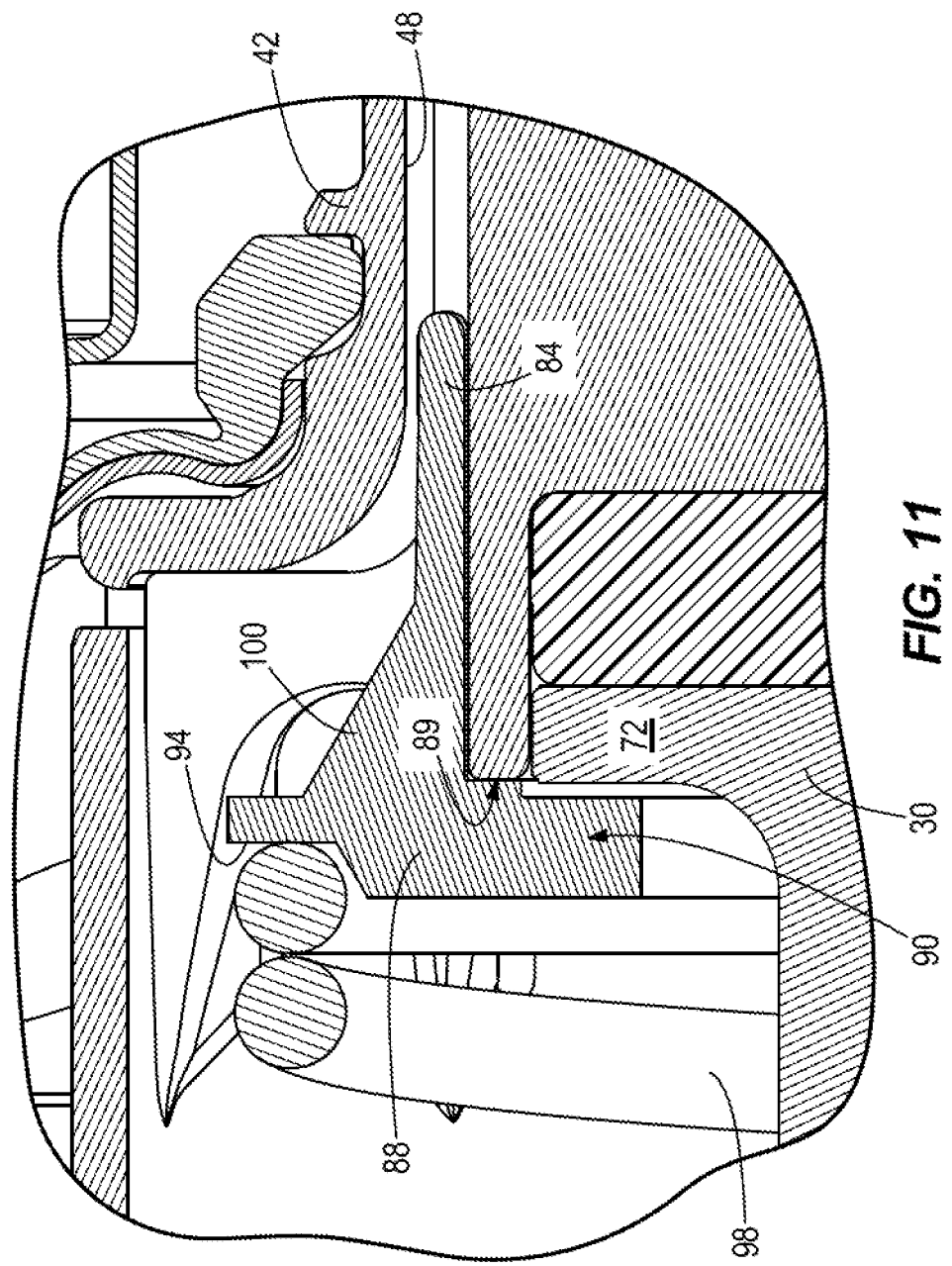
FIG. 11 is a cross-sectional view of the restrictor element of FIGS. 9 and 10 positioned in a poppet valve body of the booster.

FIGS. 9-11 illustrate another alternate restrictor element 50D which is an integral structure serving as a pushrod retainer and also having a plurality of restriction portions 84 that fit into corresponding side ports 48 of the poppet valve body 42 to set the release speed. The restriction portions 84 are all coupled to a connector ring 88, and can be integrally formed (e.g., molded) as a single piece therewith. However, unlike the constructions previously described, the connector ring 88 of FIGS. 9-11 is positioned generally beyond the end surface 89 of the poppet valve body 42 and has a substantial radially inward extension 90. The extension 90 extends inward past the innermost extent of the side ports 48. As shown in FIG. 11, the extension 90 overlaps with the flanged end 72 of the output pushrod 30. Thus, the extension 90 operates to retain the output pushrod 30 relative to the poppet valve body 42 and no separate pushrod retainer is provided or required. A radially outward edge of the connector ring 88 includes a spring seat 94 for abutting with a primary bias spring 98 of the booster 20. Also shown in the construction of FIGS. 9-11 is that each restriction portion 84 can be supported by a rib or gusset structure 100 (e.g., on a radially outer side thereof) to the connector ring 88.

Figure 12:
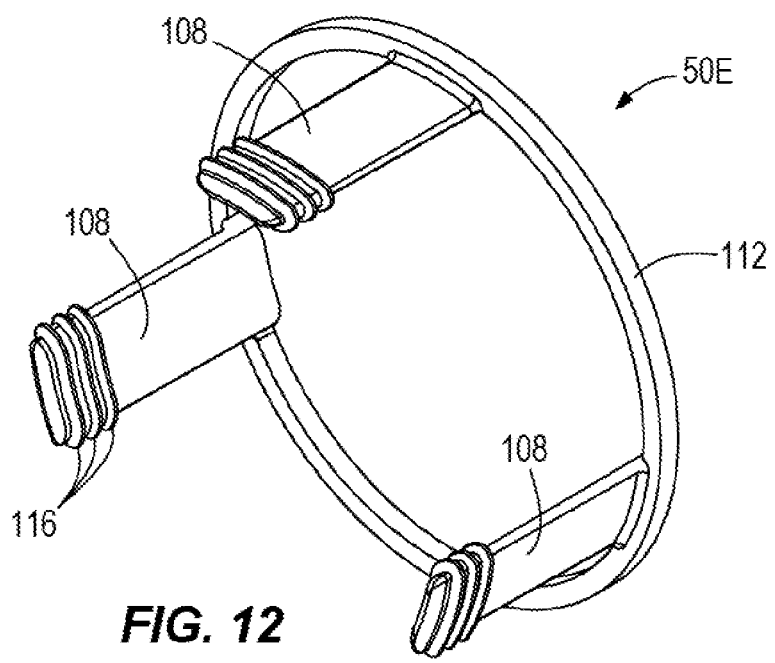
FIG. 12 is a perspective view of yet another restrictor element in which multiple restrictor portions are formed as plugs.
Figure 13:
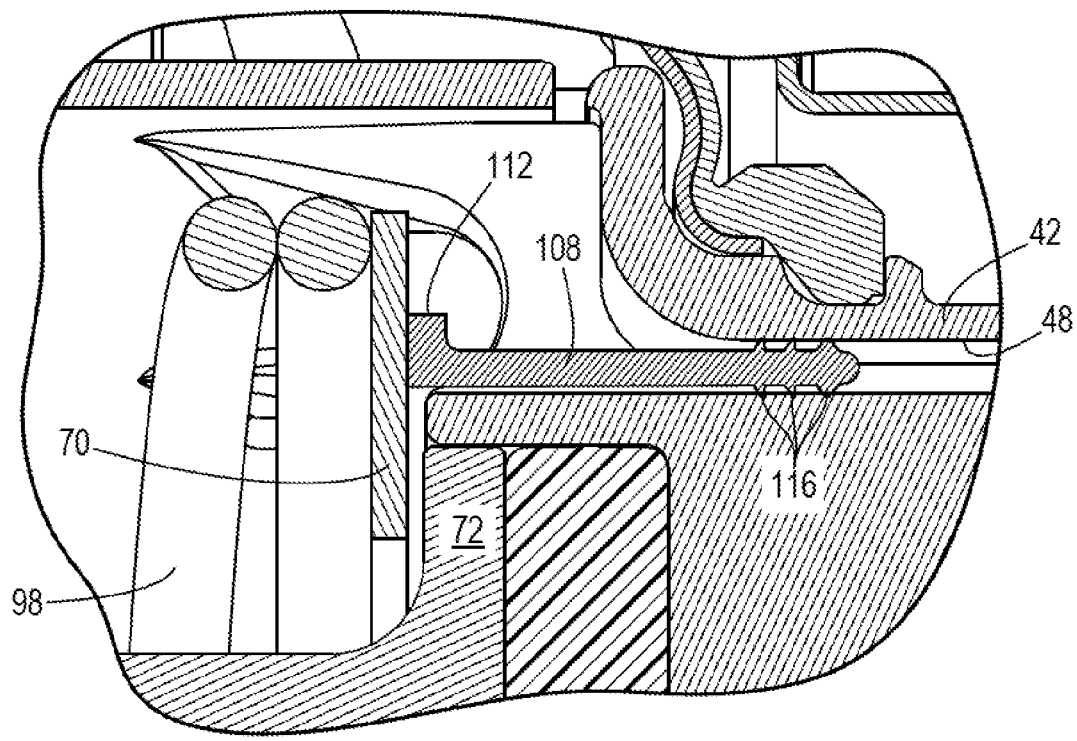
FIG. 13 is a cross-sectional view of the restrictor element of FIG. 12 positioned in a poppet valve body of the booster.

FIGS. 12 and 13 illustrate another alternate restrictor element 50E. The restrictor element 50E includes at least one restriction portion 108 provided as a plug to block a corresponding one of the plurality of side ports 48. Although not required, the illustrated restrictor element 50E also includes a connector ring 112 which can be integrally formed (e.g., molded) as a single piece therewith to prevent separation of the restriction portions. It should be noted that a connector ring can be provided if desired, even if only one restriction portion is provided, in this or any other construction described herein. When the restriction portions 108 are provided as plugs, the restriction portions 108 should generally be fewer in number than the total number of side ports 48 in the poppet valve body 42 such that release flow of air is still possible. The plug style restriction portions 108 essentially eliminate certain ones of the side ports 48 from service, similar to the poppet valve body 42 being manufactured with less open side ports 48. This is in contrast to placing predetermined restrictions that reduce the side ports 48 from their full size to a restricted, but yet flow-enabling, size. In the construction of the plug type restriction portions 108, flexible barbs 116 may be provided. The flexible barbs 116 can be adjacent each other at a distal end of the restriction portion 108. In some constructions, the flexible barbs 116 can be constructed by overmolding a second material (e.g., a softer rubber material) onto a first base material (e.g., a harder rubber material). The flexible barbs 116 conform to the side port 48 and form a series of seals to block the flow of air through the side port.

Figure 14:
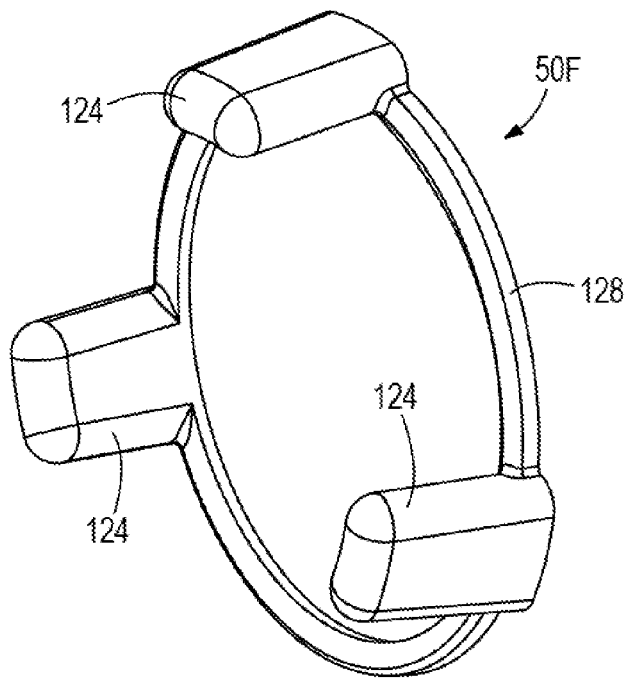
FIG. 14 is a perspective view of yet another restrictor element.

FIG. 14 illustrates another alternate restrictor element 50F. The restrictor element 50F includes a number of restriction portions 124 coupled to a common connector ring 128, which can be integrally formed (e.g., molded) as a single piece therewith to prevent separation of the restriction portions 124. The restriction portions 124 are configured as plug type restrictions and each of the restriction portions 124 has a rounded distal end. The restriction portions 124, or the restrictor element as a whole can be constructed of an elastomer or other compressible material (e.g., soft foam or soft rubber) to achieve good sealing properties.

Figure 15:
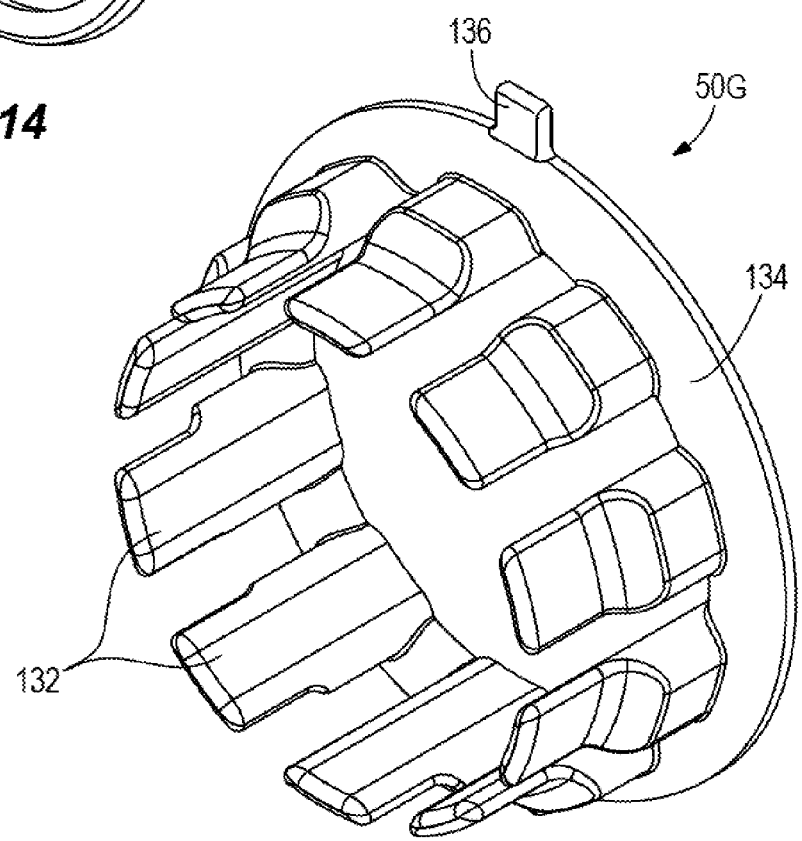
FIG. 15 is a perspective view of yet another restrictor element.

FIG. 15 illustrates another alternate restrictor element 50G. The restrictor element 50G includes a number of restriction portions 132 coupled to a common connector ring 134, which can be integrally formed (e.g., molded) as a single piece therewith to prevent separation of the restriction portions 132. Each of the restriction portions 132 has a shape generally similar to those of the restrictor element 50C of FIG. 8. However, the connector ring 134 of FIG. 15 further includes a tab 136 extending radially outwardly from the connector ring 134 at one particular location for visually detecting the presence of the restrictor element 50G once assembled. Although one tab 136 is shown, the restrictor element 50G can include an alternate number of tabs (e.g., 2 or 3 tabs). The tab(s) 136 not only provide visual detection of the restrictor element 50G when assembled behind the pushrod retainer 70, but may also be used to aid alignment with respect to the valve body 42 during a blind assembly process. For example, the tab(s) 136 can interface with an assembly tool to lock a known orientation during insertion into the poppet valve body 42, which is also held in a known orientation so that the restriction portions 132 are aligned with the side ports 48.

Figure 16:
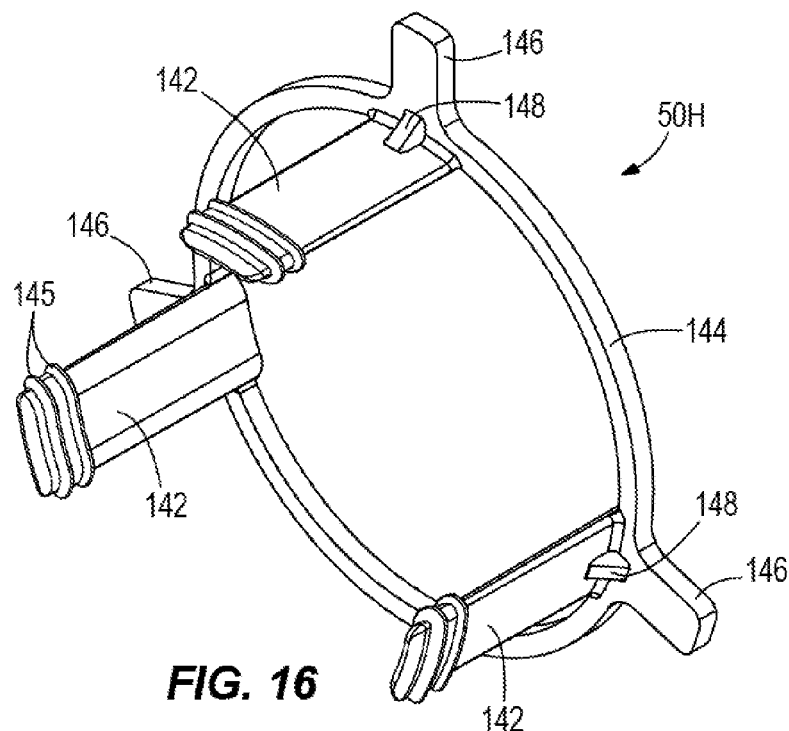
FIG. 16 is a perspective view of yet another restrictor element.

FIG. 16 illustrates another alternate restrictor element 50H. The restrictor element 50H includes a number of restriction portions 142 coupled to a common connector ring 144, which can be integrally formed (e.g., molded) as a single piece therewith to prevent separation of the restriction portions 142. Each of the restriction portions 142 is generally similar to those of the restrictor element 50E of FIGS. 12 and 13, which are plug type portions with flexible barbs 145. However, the connector ring 144 of FIG. 16 further includes a tab 146 extending radially outwardly from the connector ring 144 at each particular location of the restriction portions 142 for aiding assembly and/or visually detecting the presence of the restrictor element 50H once assembled. More or fewer tabs 146 can also be provided. Each of the restriction portions 142 is also supported relative to the connector ring 144 with a rib or gusset 148.

Figure 17:
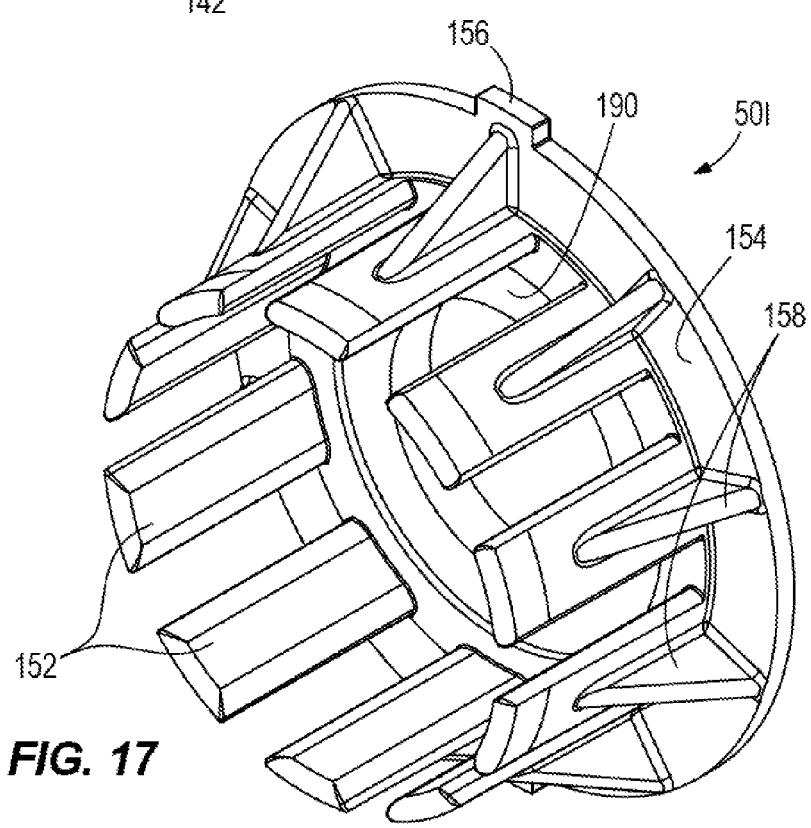
FIG. 17 is a perspective view of yet another restrictor element.

FIG. 17 illustrates another alternate restrictor element 50I. The restrictor element 50I includes a number of restriction portions 152 coupled to a common connector ring 154, which can be integrally formed (e.g., molded) as a single piece therewith to prevent separation of the restriction portions 152. The restrictor element 50I is generally similar to the restrictor element 50D of FIGS. 9-11, and also forms a pushrod retainer via a radially inward extension 190. However, the connector ring 154 of FIG. 16 further includes a tab 156 extending radially outwardly from the connector ring 154 at one particular location for aiding assembly and/or visually detecting the presence of the restrictor element 50I once assembled. Although one tab 156 is shown, the restrictor element 50I can include an alternate number of tabs (e.g., 2 or 3 tabs). Each of the restriction portions 152 is also supported relative to the connector ring 154 with a rib or gusset 158. Contrary to the gussets of FIGS. 9-11, the gussets 158 extend all the way to a radially outer edge of the connector ring 154. The gussets 158 also extend along at least half of the axial length of each of the restriction portions 152. In this way, the gussets 158 provide additional strength and rigidity.

It should be appreciated that the particular constructions illustrated and described herein are not exhaustive, and that other design variations are contemplated, not limited to the different combinations or permutations of features included in all of the individual constructions. In addition, the number of side ports, the shape of the side ports, and their arrangement within a valve body are variable among numerous design variants and none of the constructions shown should be considered limited in any way by the particular port configuration shown in the poppet valve body 42. However, once a side port configuration is chosen for the poppet valve body 42, the use of a selected type of restrictor element can essentially adapt or tune the poppet valve body 42 to provide a different release speed. In practice, the side port configuration may be designed to provide the fastest release speed desired for one particular application, and identical copies of the poppet valve body 42 can each be adapted with different restrictor elements to suit other applications in which different, slower release speeds are desired. Thus, the poppet valve body 42 can be extended in its service to be universal for a number of applications, and only minimal effort is required to vary the performance to a multitude of release speeds that may be desirable for each different applications.

Various features and advantages of the invention are set forth in the following claims.

What is claimed is:
1. A vehicle brake booster comprising:
a brake input member configured to receive a braking input force;
a booster housing divided into a first chamber adjacent the brake input member and a second chamber remote from the brake input member;
a poppet valve including a poppet valve body and a poppet seal, the poppet valve being operable to maintain separation between air having a pressure in the first chamber and a vacuum in the second chamber during assisted braking and further being operable to enable evacuation of the air from the first chamber through one or more side ports of the poppet valve body upon release of the braking input force and completion of the assisted braking; and
a restrictor element separate from the poppet valve body and configured to provide a predetermined release speed for the booster;
wherein the one or more side ports define a total flow resistance of the poppet valve body which is less than an effective total flow resistance of the poppet valve body set by the restrictor element, wherein the poppet valve body includes a plurality of side ports, and the restrictor element restricts less than all of the plurality of side ports, and
wherein the restrictor element includes at least one restriction portion provided as a plug to block one of the plurality of side ports.

2. The vehicle brake booster of claim 1, wherein the restrictor element is fixed with respect to the poppet valve body.

3. A vehicle brake booster comprising:
a brake input member configured to receive a braking input force;
a booster housing divided into a first chamber adjacent the brake input member and a second chamber remote from the brake input member;
a poppet valve including a poppet valve body and a poppet seal, the poppet valve being operable to maintain separation between air having a pressure in the first chamber and a vacuum in the second chamber during assisted braking and further being operable to enable evacuation of the air from the first chamber through one or more side ports of the poppet valve body upon release of the braking input force and completion of the assisted braking; and
a restrictor element separate from the poppet valve body and configured to provide a predetermined release speed for the booster;
wherein the one or more side ports define a total flow resistance of the poppet valve body which is less than an effective total flow resistance of the poppet valve body set by the restrictor element, and
wherein the poppet valve body includes a plurality of side ports and the restrictor element includes a plurality of restriction portions, each of the plurality of restriction portions being secured to a connector ring.

4. The vehicle brake booster of claim 3, wherein the plurality of restriction portions and the connector ring are integrally molded as a single piece.

5. A vehicle brake booster comprising:
a brake input member configured to receive a braking input force;
a booster housing divided into a first chamber adjacent the brake input member and a second chamber remote from the brake input member;
a poppet valve including a poppet valve body and a poppet seal, the poppet valve being operable to maintain separation between air having a pressure in the first chamber and a vacuum in the second chamber during assisted braking and further being operable to enable evacuation of the air from the first chamber through one or more side ports of the poppet valve body upon release of the braking input force and completion of the assisted braking;
a restrictor element separate from the poppet valve body and configured to provide a predetermined release speed for the booster, wherein the one or more side ports define a total flow resistance of the poppet valve body which is less than an effective total flow resistance of the poppet valve body set by the restrictor element;
an output pushrod configured to move with the poppet valve body and transmit an output force greater than the input force on the brake input member; and
a pushrod retainer securing the output pushrod relative to the poppet valve body,
wherein a retaining portion of the restrictor element is positioned between the pushrod retainer and the poppet valve body.

6. A vehicle brake booster comprising:
a brake input member configured to receive a braking input force;
a booster housing divided into a first chamber adjacent the brake input member and a second chamber remote from the brake input member;
a poppet valve including a poppet valve body and a poppet seal, the poppet valve being operable to maintain separation between air having a pressure in the first chamber and a vacuum in the second chamber during assisted braking and further being operable to enable evacuation of the air from the first chamber through one or more side ports of the poppet valve body upon release of the braking input force and completion of the assisted braking;
a restrictor element separate from the poppet valve body and configured to provide a predetermined release speed for the booster, wherein the one or more side ports define a total flow resistance of the poppet valve body which is less than an effective total flow resistance of the poppet valve body set by the restrictor element;
an output pushrod configured to move with the poppet valve body and transmit an output force greater than the input force on the brake input member; and
a pushrod retainer securing the output pushrod relative to the poppet valve body,
wherein the restrictor element is integrally formed as a single piece with the pushrod retainer.

7. A vehicle brake booster comprising:
a brake input member configured to receive a braking input force;
a booster housing divided into a first chamber adjacent the brake input member and a second chamber remote from the brake input member;
a poppet valve including a poppet valve body and a poppet seal, the poppet valve being operable to maintain separation between air having a pressure in the first chamber and a vacuum in the second chamber during assisted braking and further being operable to enable evacuation of the air from the first chamber through one or more side ports of the poppet valve body upon release of the braking input force and completion of the assisted braking;
a restrictor element separate from the poppet valve body and configured to provide a predetermined release speed for the booster, wherein the one or more side ports define a total flow resistance of the poppet valve body which is less than an effective total flow resistance of the poppet valve body set by the restrictor element;
an output pushrod configured to move with the poppet valve body and transmit an output force greater than the input force on the brake input member; and
a pushrod retainer securing the output pushrod relative to the poppet valve body,
wherein the restrictor element includes a plurality of restriction portions interconnected by the pushrod retainer.

8. A method for adapting a vehicle brake booster for a desired release speed, the method comprising:
providing a brake booster including a poppet valve having a poppet valve body including a plurality of side ports through which air flows to escape a pressure side of the brake booster after completion of a brake actuation, the plurality of side ports defining a total flow resistance of the poppet valve body;
inserting a restrictor element having at least one restriction portion at least partially obstructing a corresponding at least one of the plurality of side ports to set an effective total flow resistance of the poppet valve body to a predetermined amount that is higher than the total flow resistance of the poppet valve body, wherein the restrictor element is provided with a plurality of restriction portions; and retaining the plurality of restriction portions together with a connector ring.

9. The method of claim 8, further comprising securing a position of the restrictor element with respect to the poppet valve body via contact between the connector ring and a pushrod retainer of the brake booster.

10. The method of claim 8, further comprising retaining a pushrod of the brake booster with the connector ring.

11. The method of claim 8, wherein inserting the restrictor element includes partially obstructing each of the plurality of side ports.

12. The method of claim 8, wherein inserting the restrictor element includes partially obstructing selected ones of the plurality of side ports that equal less than all of the plurality of side ports.

13. A method for adapting a vehicle brake booster for a desired release speed, the method comprising:

providing a brake booster including a poppet valve having a poppet valve body including a plurality of side ports through which air flows to escape a pressure side of the brake booster after completion of a brake actuation, the plurality of side ports defining a total flow resistance of the poppet valve body; and inserting a restrictor element having at least one restriction portion at least partially obstructing a corresponding at least one of the plurality of side ports to set an effective total flow resistance of the poppet valve body to a predetermined amount that is higher than the total flow resistance of the poppet valve body, wherein inserting the restrictor element includes plugging selected ones of the plurality of side ports that equal less than all of the plurality of side ports.

* * * * *